United States Patent
Luo et al.

(10) Patent No.: US 10,565,523 B2
(45) Date of Patent: Feb. 18, 2020

(54) SECURITY CLASSIFICATION BY MACHINE LEARNING

(71) Applicant: Accenture Global Solutions Limited, Dublin (IE)

(72) Inventors: Song Luo, Gaithersburg, MD (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 505 days.

(21) Appl. No.: 15/400,112

(22) Filed: Jan. 6, 2017

(65) Prior Publication Data
US 2018/0197105 A1 Jul. 12, 2018

(51) Int. Cl.
*G06N 20/00* (2019.01)
*G06Q 10/10* (2012.01)
*G06F 16/35* (2019.01)

(52) U.S. Cl.
CPC ........... *G06N 20/00* (2019.01); *G06F 16/355* (2019.01); *G06Q 10/10* (2013.01)

(58) Field of Classification Search
CPC ....... G06N 20/00; G06F 16/355; G06Q 10/10
See application file for complete search history.

(56) References Cited

U.S. PATENT DOCUMENTS

| | | | | |
|---|---|---|---|---|
| 7,818,319 | B2 * | 10/2010 | Henkin | G06Q 30/0255 707/726 |
| 8,078,625 | B1 * | 12/2011 | Zhang | G06F 16/954 707/748 |
| 8,244,651 | B1 | 8/2012 | Lin et al. | |
| 8,713,007 | B1 * | 4/2014 | Korolev | G06N 5/048 707/729 |
| 8,805,840 | B1 * | 8/2014 | Joshi | G06F 16/951 707/737 |
| 9,514,414 | B1 * | 12/2016 | Rosswog | G06F 16/93 |
| 2004/0128355 | A1 * | 7/2004 | Chao | H04L 63/14 709/206 |
| 2006/0277173 | A1 * | 12/2006 | Li | G06F 17/211 |
| 2008/0104052 | A1 * | 5/2008 | Ryan | G06F 17/2745 |

(Continued)

OTHER PUBLICATIONS

Partial European Search Report issued in European Application No. 18150475.4, dated Jun. 6, 2018, 13 pages.

*Primary Examiner* — Vincent Gonzales
*Assistant Examiner* — Tri T Nguyen
(74) *Attorney, Agent, or Firm* — Fish & Richardson P.C.

(57) ABSTRACT

A computer-implemented method that includes a computing system receiving a plurality of data items that include content data. The system then generates a first inference model based on the received content data. The system also receives metadata associated with respective data items and then generates a second inference model based on the received metadata data. The system further determines, based on the first inference model, a first weight parameter associated with the content data, and determines, based on the second inference model, a second weight parameter associated with the metadata. The system then generates a classification model for determining a classification of at least one data item of the plurality of data items. The classification model is generated based on at least one of the first weight parameter or the second weight parameter.

17 Claims, 5 Drawing Sheets

(56) References Cited

U.S. PATENT DOCUMENTS

| | | | |
|---|---|---|---|
| 2011/0004573 A1* | 1/2011 | Chitiveli | G06N 20/00 706/12 |
| 2014/0280173 A1* | 9/2014 | Scholtes | G06N 7/005 707/740 |
| 2015/0254469 A1* | 9/2015 | Butler | G06F 21/6218 706/12 |
| 2016/0224662 A1* | 8/2016 | King | G06F 16/951 |
| 2016/0232456 A1* | 8/2016 | Jain | G06N 20/00 |
| 2018/0336479 A1* | 11/2018 | Guttmann | G06N 20/00 |

* cited by examiner

SECURITY CLASSIFICATION BY MACHINE LEARNING

CROSS-REFERENCE TO RELATED APPLICATION

This application is related to U.S. patent application Ser. No. 15/400,298, entitled "Systems and Methods for Updating a Classification Model," filed on Jan. 6, 2017. The entire disclosure of U.S. patent application Ser. No. 15/400,298 is expressly incorporated by reference herein in its entirety.

FIELD

The present specification is related to classification of electronic data items.

BACKGROUND

Computer networks include multiple computing assets that enable individuals or users to access shared resources including a variety of digital content and electronic data items. Various entities such as private corporations, clandestine services and defense organizations can have large networked data sets that include a variety of electronic documentation. These electronic documents can include sensitive information. The sensitive data content or other attributes associated with the documents can require network users within the various entities to apply a particular security label or classification to the electronic document.

SUMMARY

The subject matter described in this specification relates to systems and methods that utilize machine learning logic to generate one or more classification models for determining a security classification or label for electronic documents. The described subject matter includes use of at least one of: data contents of the electronic document to generate a data contents classification model, metadata associated with the document to generate at least one metadata classification model, or an environment context of the electronic document to generate a dataset that includes multiple contextual factors. The data contents classification model, the at least one metadata classification model, and at least one contextual factor can each correspond to a respective weight parameter. Each of the respective weight parameters is used to generate one or more final classification models for determining security classifications for a variety of different electronic documents.

An innovative aspect of the subject matter described in this specification can be embodied in a computer-implemented method. The method includes, receiving, by a computing system, a plurality of data items comprising content data; and generating, by the computing system, a first inference model based on the received content data. The method also includes receiving, by the computing system, metadata associated with respective data items of the plurality of data items; and generating, by the computing system, a second inference model based on the received metadata data associated with the respective data items. The method further includes determining, by the computing system and based on the first inference model, a first weight parameter associated with the content data; and determining, by the computing system and based on the second inference model, a second weight parameter associated with the metadata. The method includes generating, by the computing system and based on at least one of the first weight parameter or the second weight parameter, a classification model for determining a classification of at least one data item of the plurality of data items.

These and other implementations can each optionally include one or more of the following features. For example, in some implementations, the method further includes, receiving, by the computing system, context data for generating one or more contextual factors associated with the respective data items of the plurality of data items; determining, by the computing system, a third weight parameter based on at least one contextual factor of the one or more contextual factors associated with the respective data items; and wherein generating the classification model for determining the classification of the at least one data item is further based on the third weight parameter.

In some implementations, generating the classification model includes, using, by the computing system, one or more machine-learning processes to generate the classification model for determining the classification of the at least one data item, wherein at least one of the first weight parameter or the second weight parameter is used by at least one machine-learning algorithm to generate the classification model.

In some implementations, the plurality of data items includes an electronic document comprising text based content, and the method further includes: scanning, by the computing system, the electronic document to identify text based content data associated with a particular document classification; and generating, by the computing system, the first inference model based on the identified text based content data.

In some implementations, the method further includes, using, by the computing system, the first inference model to infer a first probability factor that the identified text based content indicates a particular document classification, the first probability factor corresponding to the first weight parameter. In some implementations, the plurality of data items includes an electronic document having a plurality of attributes, and the method further includes, scanning, by the computing system, the electronic document for metadata corresponding to a particular attribute associated with a particular document classification; and generating, by the computing system, the second inference model based on the particular attribute.

In some implementations, the method further includes, using, by the computing system, the second inference model to infer a second probability factor that the particular attribute indicates a particular document classification, the second probability factor corresponding to the second weight parameter. In some implementations, the method further includes, determining, by the computing system, the classification of the at least one data item using the classification model; validating, by a data validator, that the classification of the at least one data item determined using the classification model is a correct classification relative to particular content of the at least one data item; and providing, by the computing the system, the classified data item for display on a computing device accessible by a user.

In some implementations, the method further includes, determining, by the computing system, the classification of the at least one data item using the classification model, the classification including at least one of a sensitive classification, a confidential classification, a secret classification, or a top secret classification.

Other implementations of the above and other aspects include corresponding systems, apparatus, and computer programs, configured to perform the actions of the methods, encoded on computer storage devices. An electronic system of one or more computers can be so configured by virtue of software, firmware, hardware, or a combination of them installed on the electronic system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and methods for determining a security classification or label for electronic documents. The described systems and methods use machine learning logic to generate one or more classification models and further use extraction logic to generate at least one dataset that can include multiple contextual factors. The system can provide, for each model, respective weight parameters that are determined by a model weighting module. Additionally, at least one contextual factor can correspond to another weight parameter that is also determined by the model weighting module. A final classification model can be generated from the weighting module based on the multiple weight parameters. The final classification model is used to determine a security classification of one or more electronic documents.

The one or more classification models can include processing devices that execute machine learning algorithms to generate learned inferences based on received datasets. For example, a first classification model can receive datasets corresponding to text based content of an electronic document. In another example, a second classification model can receive datasets corresponding to metadata attributes associated with an electronic document. The metadata attributes can include attributes such as an author of the electronic document or a business category of the document. The at least one contextual factor can include factors such as a current security policy or organizations that are affiliated with the electronic document.

The learned inferences by the first classification model can associate a particular security classification with certain reoccurring text scanned or extracted from datasets related to text based content. A particular weight parameter can be generated to indicate a probability that a particular document that includes certain text content should receive a particular security classification. Likewise, learned inferences by the second classification model can associate a particular security classification with certain reoccurring attributes scanned or extracted from datasets related to metadata. A weight parameter can be generated to indicate a probability that a document including certain metadata attributes should receive a particular security classification.

Figure 1:
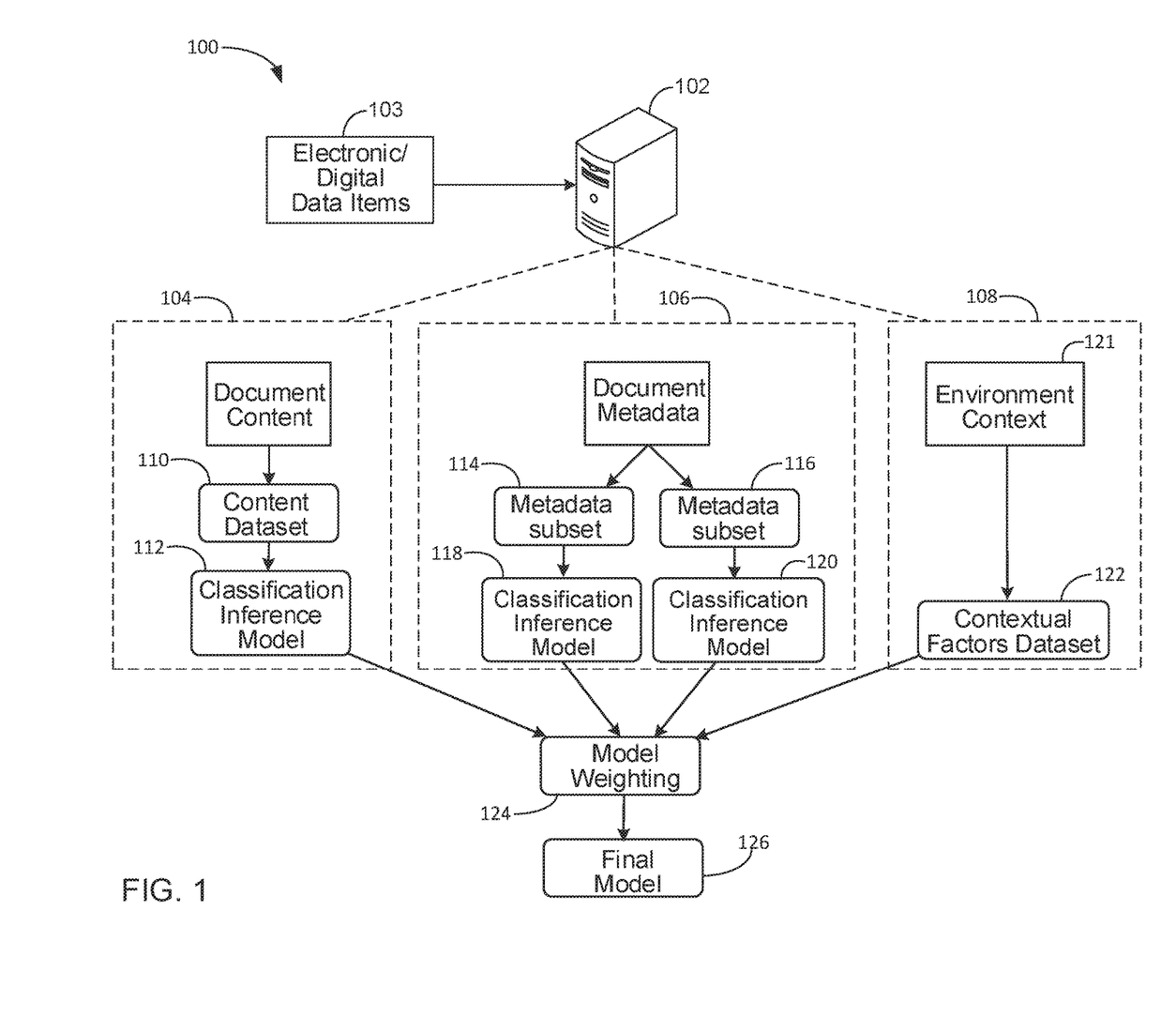
FIG. 1 illustrates a block diagram of an example computing system for generating at least one final model for determining security classifications.

FIG. 1 illustrates a block diagram of an example computing system 100 for generating at least one final model for determining security classifications. As used in this specification, while security classification and security label are synonymous, in some stances references to security classification can include an example classification operation performed by system 200 to generate a security label for a document.

System 100 includes a computing device 102 that can receive multiple electronic/digital data items 103 as well as data associated with the electronic items such as context data and metadata. Computing device 102 can include one or more different computing devices such as computing servers or a variety of different cloud-based computer systems. Further, computing device 102 can include multiple processing units, computer storage mediums, and/or computing modules configured to execute computer program code, machine readable instructions, or logic algorithms.

As shown, computing device 102 can include a content module 104, a metadata module 106, a context module 108, and a model weighting module 124. As described in more detail below, the respective modules of system 100 cooperate to produce a final model 126 for determining classifications for one or more electronic data items 103. As used in this specification, electronic/digital data items 103 can include various digital computer based files or electronic documents such as documents produced by Microsoft Office® application programs. The electronic documents can include a variety of content such as text content, image content, video content. The electronic documents/files can be also associated with a variety of file formats.

In some implementations, computing device 102 can include additional or fewer modules and system 100 can include one or more additional computing devices or related server devices. The modules of system 100 can be associated with computing device 102 and, for example, can be disposed within device 102. In alternative implementations, the modules of system 100 can include independent computing devices that are coupled to, and in data communication with, device 102.

Modules 104, 106, and 108 are representative of machine learning, neural network inference computations, and/or data extraction and analysis functions that can be executed by device 102. As used in this specification, the term "module" is intended to include, but is not limited to, one or more computers configured to execute one or more software programs that include program code that causes a processing device(s) or unit(s) of the computer to execute one or more functions. The term "computer" is intended to include any data processing device, such as a desktop computer, a laptop computer, a mainframe computer, a personal digital assistant, a server, a handheld device, or any other device able to process data.

Computing device 102 and modules 104, 106, and 108 can each include processing units or devices that can include one or more processors (e.g., microprocessors or central processing units (CPUs)), graphics processing units (GPUs), application specific integrated circuits (ASICs), or a combination of different processors. In alternative embodiments, device 102 and modules 104, 106, and 108 can each include other computing resources/devices (e.g., cloud-based servers) that provide additional processing options for performing one or more of the machine learning determinations and calculations described in this specification.

The processing units or devices can further include one or more memory units or memory banks. In some implementations, the processing units execute programmed instructions stored in memory to cause device 102 and modules 104, 106, and 108 to perform one or more functions described in this specification. The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Content module 104 includes a content dataset 110 that can be used to generate classification inference model 112. Content dataset 110 can include a subset of electronic data items 103 provided to device 102. In some implementations, a processing unit of module 104 can execute program code to scan the subset of data items 103 for content that can be used to generate or build an initial classification model 112.

For example, system 100 can be deployed or launched in an example computing network and initiate scans and analysis of multiple electronic data items 103 that have either: 1) existing security labels; or 2) no security labels. The multiple electronic data items 103 can be stored in an example document repository of the computing network. For a subset of data items 103 that form content dataset 110, module 104 can execute program code to scan, detect, retrieve or otherwise extract text, image or other content associated with the subset of data items. Further, for documents that include existing security labels, module 104 can also scan, detect, retrieve or otherwise extract current security labels/classifications of each data item 103 of dataset 110.

In some implementations, module 104 can associate certain text content with a particular security classification based on, for example, the text content occurring within multiple data items 103 in excess of a threshold amount. Content module 104 can execute embedded machine learning logic to iteratively train model 112 and to generate or build subsequent iterations of model 112 that are used by system 100 to generate one or more classification inferences.

For example, module 104 can scan or analyze an electronic document to detect text content including one or more key words or n-grams that correspond to a particular security label or security classification. The analyzed text, key words, or n-grams can also be extracted and/or stored within a memory unit of module 104 and referenced during execution of the one or more iterative training processes.

As used in this specification, an n-gram can be a contiguous sequence of text content extracted from a particular sequence of electronic text and/or speech. The text content can be associated with syllables, letters, words or base pairs that can be collected from a text corpus. Further, as used in this specification, and with reference to module 104, an example classification model or classification inference model can include one or more relational data sets or data structures that associate, for example, particular text content with a corresponding security label. In some implementations, the relational data sets can be produced or generated based on module 104 executing one or more machine learning algorithms.

In some implementations, module 104 can use computing processes to infer a probability factor. The computing processes can include outputs of machine learning inference computations that generate at least one initial classification inference model 112. The probability factor can indicate a certain likelihood that identified text content corresponds to a particular document security classification or label. The probability factors of inference model 112 can be used by model weighting module 124 to generate final classification model 126.

Metadata module 106, includes at least one subset of metadata 114, 116 that can each be used to generate at least one classification inference model 118, 120. Metadata module 106 can include data processing and computing functions that are substantially similar to the processing and computing functions of content module 104. Hence, metadata subset 114, 116 can likewise include a subset of the electronic/digital data items 103 provided to device 102. Stated another way, in some implementations, a subset of the data items 103 provided to device 102 can be analyzed by module 106. In response to the performed analysis, metadata attributes can be extracted to form respective metadata subsets 114 and 116.

In some implementations, the subset of data items 103 included in module 106 can be the same as the subset of data items 103 included in module 104. In alternative implementations, modules 104 and 106 can include different data items 103 or can include at least one data item that is the same between each of modules 104 and 106. In some implementations, a processing unit of module 106 can execute program code to scan, detect, retrieve or otherwise extract metadata content associated with the subset of data items 103 included in metadata subsets 114, 116. The extracted metadata that can be used to generate or build at least one initial classification model 118, 120.

For example, as noted above, system 100 can be deployed or launched in an example computing network and initiate scans and analysis of multiple electronic data items 103 that have either: 1) existing security labels; or 2) no security labels. Module 106 can scan, detect, retrieve or otherwise extract the current security labels/classifications of each of the multiple electronic data items. Further, module 106 can associate certain metadata attributes with a particular security classification based on, for example, the metadata attribute being associated with multiple data items 103 in excess of a threshold amount.

Metadata module 106 can execute embedded machine learning logic to iteratively train models 118, 120 and to generate or build subsequent iterations of models 118, 120 that are used by system 100 to generate one or more classification inferences. For example, module 106 can scan or analyze an electronic document to detect metadata that can include certain document attributes that correspond to a particular security label or security classification. The analyzed metadata can also be extracted and/or stored within a memory unit of module 106 and referenced during execution of the one or more iterative training processes.

As used in this specification, metadata can include a variety of electronic data item attributes such as: a data item author, creator, or originator; a data item file type or file extension; intended clients or intended recipients of the data item; a data item title; data item creation date; a business organization associated with the data item; or any other metadata or data item attribute typically associated with electronic or digital files or documents.

Much like classification inference model 112, classification model or classification inference models 118, 120 can each include one or more relational data sets or data structures that associate, for example, particular metadata attributes with a corresponding security label. In some implementations, these relational data sets can be produced or generated based on module 106 executing one or more machine learning algorithms.

In some implementations, module 106 can use computing processes to infer a probability factor associated with each of models 118 and 120. The computing processes can include outputs of machine learning inference computations that generate at least one respective initial classification inference model 118, 120. This probability factor can indicate a certain likelihood that identified metadata corresponds to a particular document security classification or label. The probability factors of inference models 118, 120 can be used by model weighting module 124 to generate classification model 126.

Context module 108 includes environment context 121 that can be used to generate contextual factors dataset 122. In some implementations, context module 108 can include data processing and computing functions that are similar to the processing and computing functions of modules 104 and 106. Hence, contextual factors dataset 122 can likewise include a subset of the electronic/digital data items 103 provided to device 102. Stated another way, in some implementations, a subset of the data items 103 provided to device 102 can be used to form environment context 121. Context 121 can be analyzed by module 108 and, in response to the performed analysis, contextual factors can be extracted or inferred to form at least one contextual factors dataset 122.

In some implementations, the subset of data items 103 included in module 108 can be the same as the subset of data items 103 included in modules 104 or 106. In alternative implementations, modules 104, 106, and 108 can include different data items 103 or can include at least one data item that is the same between each of modules 104, 106, 108. In some implementations, a processing unit of module 108 can execute program code to infer, detect, retrieve or otherwise obtain multiple contextual factors associated with the subset of data items 103 forming environment context 121.

As used in this specification, environment contexts can relate to or include a variety of data that indicate a particular business context, policy context, or organizational affiliation of at least one electronic data item 103. Moreover, contextual factors can be a sub-context of a particular environment context. For example, data or correspondences relating to a pending business merger can indicate a particular business related contextual factor such as mergers and acquisitions (M&A).

Another contextual factor may correspond to a particular business entity or organization affiliated with the M&A correspondence. Likewise, another contextual factor may correspond to one or more policy documents owned/enforced by the entity. The one or more policy documents can specify how certain electronic data items should be managed, stored, or classified. For example, at least one policy document may specify or require that correspondences related to pending business mergers shall be classified as secret or sensitive.

As noted above, in some implementations, system 100 can scan and analyze multiple electronic data items 103 that have either existing security labels or no security labels.

Module 108 can scan, detect, retrieve or otherwise extract the current security labels/classifications of each of the multiple data items 103 associated with environment context 121. Further, module 108 can associate certain contextual factors with a particular security classification based on, for example, the contextual factors being associated with multiple data items 103 in excess of a threshold amount. Alternatively, in some instances, module 108 can associate certain contextual factors with a particular security classification based on the contextual factor being related to a particular policy context.

In some implementations, contextual factors dataset 122 can include a database of identified or inferred contextual factors and any respective corresponding classification labels. In some implementations, module 108 can execute program code to analyze one or more relations between stored contextual factors and any corresponding security classifications that are linked to a particular contextual factor. In response to analyzing the one or more relations, module 108 can determine, infer, and/or generate a probability factor.

The probability factor can correspond to a weight/influence parameter that indicates a certain likelihood that identified relations correspond to a particular document security classification or label. The probability factor can be used by model weighting module 124 to generate classification model 126. In some implementations, system 100 includes three data channels/paths that provide respective probability factors for determining weight parameters by model weighting module 124 to generate final classification model 126.

Weighting module 124 can be configured to aggregate and analyze the received inference models or probability factors that correspond to the inference models. Weighting module 124 can then determine or calculate an accuracy metric associated with each inference model. In some implementations, weighting module 124 receives accuracy metrics from modules 104, 106, and 108. With guidance from data scientists (described below), module 124 can then determine weight parameters for the respective models generated by modules 104, 106, and 108.

In some instances, models with a higher accuracy metric will receive heavier/larger weighting relative to models with lower accuracy metrics. Weights of all models will sum to 1.0. For example, inference model 112 can receive a 0.5 weighting, inference models 118, 120 can receive an aggregate 0.3 weighting, and a model for dataset 122 can receive a 0.2 weighting. Final model 126 can be generated using a particular combination of weight parameters for the respective models. In some implementations, multiple iterations of trial and error may be needed to identify the optimal combination of weight parameters.

In some implementations, the accuracy metrics can be determined, at least in part, based on manual input to system 100 from at least one data validator. For example, and as discussed in more detail below, a data validator can be used to analyze and validate one or more classification inferences generated by content classification model 112 and metadata classification models 118, 120. Likewise, the data validator can be used to analyze and validate the database relations used by module 108 to generate the weight parameter.

In some implementations, system 100 can generate one or more validation datasets. For example, system 100 can generate at least: a first validation dataset that includes a subset of classification inferences generated by classification inference model 112; and a second validation dataset that includes a subset of classification inferences generated by classification inference models 118, 120. The validation datasets include one or more classification inferences generated by models 112, 118, 120.

In some implementations, the data validator validates classification inferences that associate certain word combinations with particular security classifications. For example, during model training to generate inference model 112, content data scanned from multiple data items 103 of dataset 110 can indicate that the word combination "white house" is substantially, or generally, associated with data items that have an existing security classification of "top secret." Thus, the data validator will validate an example classification inference in the first validation dataset that links or associates the scanned or extracted content "white house" to the security label "top secret."

Similarly, the data validator validates classification inferences that associate certain metadata attributes with particular security classifications. For example, during model training to generate inference models 118, 120, metadata extracted from multiple data items 103 of metadata subsets 114, 116 can indicate that documents originating from the Finance department primarily have an existing security classification of "sensitive." Thus, the data validator will validate an example classification inference in the second validation dataset that links or associates the extracted metadata "Finance Department" to the security label "sensitive."

In some implementations, weighting module 124 determines an accuracy metric for the weight parameter linked to inference model 112 based on validation analysis of the first validation dataset. Likewise, weighting module 124 determines an accuracy metric for the weight parameter linked to inference models 114, 116 based on validation analysis of the second validation dataset. Further, weight module 124 can determine an accuracy metric for the weight parameter linked to the contextual factors 122 based on validation analysis of generated datasets that include context factors and corresponding security labels.

Weighting module 124 uses accuracy metrics to generate final weight parameters that correspond to analyzed content data, analyzed metadata, and analyzed contextual factors. The final weight parameters are used to generate a final classification model 126. Final model 126 can be deployed within an example computing network and appropriately tuned to generate accurate security classification labels of existing electronic data items 103 as well as newly created electronic data items.

As an example to illustrate the operation of system 100, device 102 can connect to an electronic document repository of an example computer network. The document repository can have several Word documents or PowerPoint files that relate to a variety of topics (intelligence, defense, mergers, divestitures, drone technology, etc.). The several word documents and presentation files can have existing security labels that indicate a classification of the documents/files. For example, some documents may have a "top secret" security label, while some may have a "sensitive" security label.

Like most documents, the word files and presentation files will include a variety of words or phrases. In some instances, documents may reside in electronic file folders that indicate the document is affiliated with the Finance, Accounting, Classified programs, or Military programs department. Further, like most Microsoft Word files, some documents can include metadata that is detectable through, for example, the properties function of the file.

Example metadata viewable when examining document properties include document title, file name, authors, date created, date modified, content type, or folder path. These document property items can be described as metadata attributes. Likewise, electronic file folder headings and other information that indicates a document's affiliation with a certain department or program can be described as a context factor.

When system 100 is launched within the example network, device 102 connects to the repository to scan each document/file and extract words or phrases from each word document/presentation file, extract metadata, extract context factors, and extract existing security labels. Extracted words or phrases can form content dataset 110, extracted metadata can form at least one metadata subset 114, 116, and extracted context factors can form dataset 122.

The inference models use machine learning logic to form associations between words/phrases in dataset 110 that were extracted from particular documents and the security labels of those documents. Through machine learning analysis of multiple extracted words and associated document security labels, device 102 forms reliable and accurate associations that are used to generate inference model 112. A similar process occurs for extracted metadata in subset 114 and associated security labels to form inference model 118, 120. Likewise, a similar process occurs for extracted context factors dataset 122 and any associated security labels.

The inference models are weighted by model weighting 124 and the final model 126 is generated based on the weighting. When final model 126 is used to classify documents, the model will generate classifications based on the weight parameter associated with model 112 and models 118, 120. Generated classifications will also take into account any associations that are included in context factors data set 122. For example, if metadata inference model 118 is weighted more heavily than content inference model 112, then final model 126 will rely more heavily on the inference associations of model 118 when generating security labels for new documents.

Figure 2:
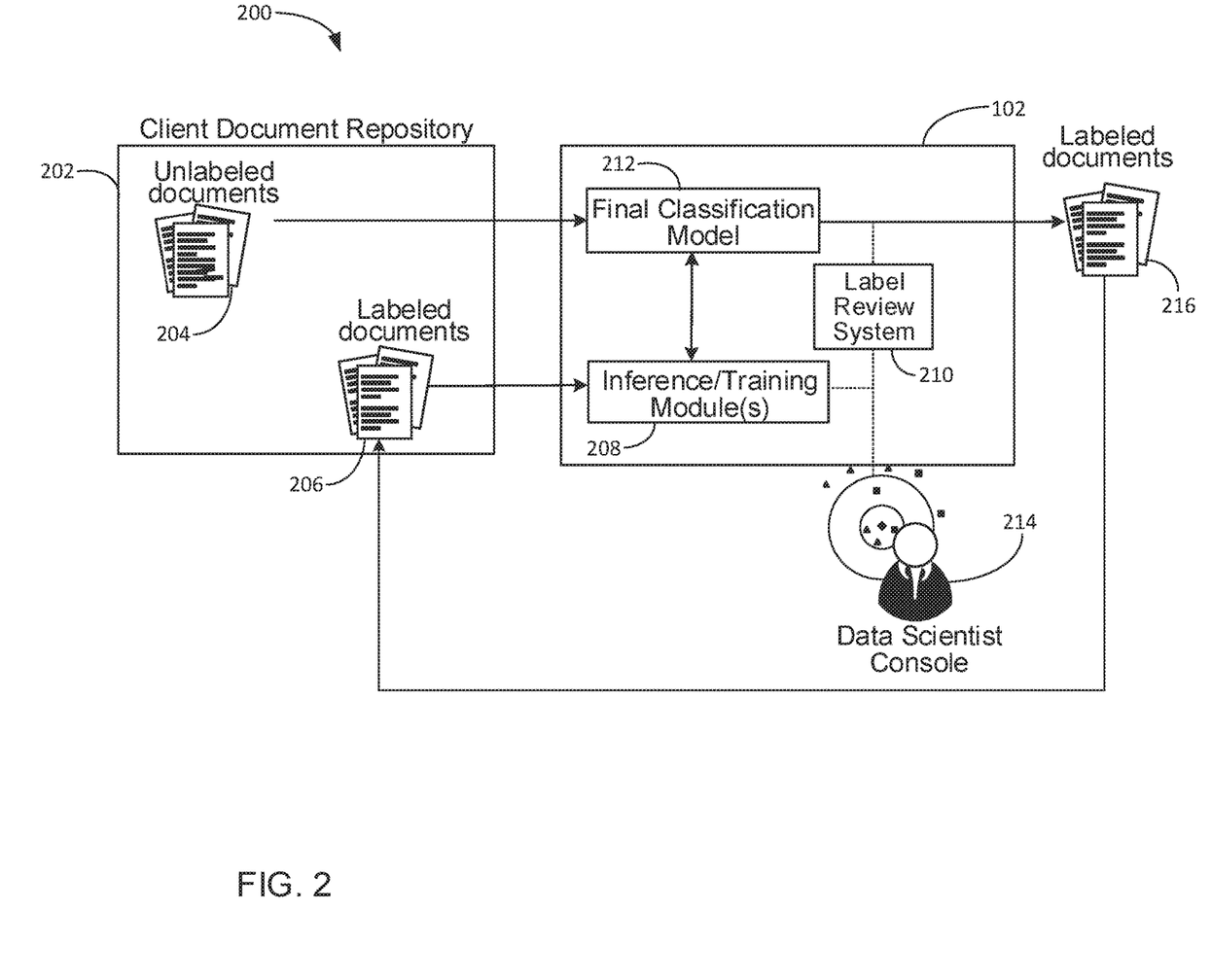
FIG. 2 illustrates a block diagram of an example computing system for validation of one or more determined security classifications for electronic data items.

FIG. 2 illustrates a block diagram of an example computing system 200 for validation of one or more determined security classifications for electronic data items. In some implementations, system 200 can be a sub-system of system 100, and so data processing functions of system 200 can be implemented, at least in part, by computing device 102. In addition to computing device 102, system 200 includes an example client or customer managed document repository 202. Document repository 202 can be an example electronic data item storage medium such as a file management system or document file server. As shown, repository 202 can store multiple electronic documents that include unlabeled documents 204 and labeled documents 206.

In the implementation of FIG. 2, computing device 102 includes one or more inference or training modules 208, security label review system 210, and final classification model 212. Inference/training modules 208 can include functionality associated with the one or more modules described above in the implementation of FIG. 1. For example, inference/training modules 208 can include data processing and machine learning functions associated with content module 104, metadata module 106, context module 108, weighting module 124. Likewise, final classification model 212 can correspond to final model 126 generated by system 100 in the implementation of FIG. 1.

Data scientist console 214 can include one or more computing assets that enable at least one data validator to interface with label review system 210. As noted above, at least one data validator can be used to analyze and validate one or more classification inferences generated by content module 104 and metadata module 106. Likewise, the data validator can be used to analyze and validate database relations used by context module 108 to generate an example weight parameter.

When initially deployed in a client's computing environment, modules 208 of system 200 receive multiple labeled documents 206. Content, metadata and contextual factors associated with labeled documents 206 are scanned, extracted and stored within an example storage medium of module 208. Likewise, security labels associated with the documents 206 are also scanned, extracted, and stored.

One or more machine learning algorithms can be executed by modules 208 to generate inference models that include multiple classifications inferences. One or more weight parameters can be generated based, at least in part, on the inference models. In some implementations, finalized weight parameters can be used to generate an example final classification model. As indicated above, in some implementations, one or more accuracy metrics for each weight parameter can be determined or calculated by an example weighting module of inference/training modules 208.

For example, modules 208 can execute program code that analyzes one or more validation datasets that include subsets of generated classification inferences that correspond to a particular weight parameter. In some implementations, a subset of inferences in at least one validation dataset can include classification inferences based on content and related security labels extracted from documents 206, or based on metadata and related security labels extracted from documents 206.

Based on the analysis of the respective validation datasets (i.e., content and metadata), accuracy metrics can be calculated that quantify the accuracy of classification inferences and corresponding weight parameters for extracted content data. Likewise, accuracy metrics can be calculated that quantify the accuracy of classification inferences and corresponding weight parameters for extracted metadata.

In some implementations, validation and/or determination of accuracy metrics can be automated based on execution of one or more test scripts by review system 210. The executed test scripts can compare generated classification inferences to standardized or baseline classification inferences relating to test data sets that include known classifications for certain existing documents. Based on this comparison, the executed test scripts can calculate an accuracy metric for a particular validation dataset or test data set.

In some implementations, one or more accuracy metrics for each weight parameter can be determined or calculated, in part, based on manual input to system 200 from at least one data validator. For example, validation datasets that include classification inferences based on extracted content data can be analyzed by at least one data validator using console 214. The determined accuracy metric can be received by label review system 210 and provided to modules 208 for use in generating final model 212.

For example, validation of certain classification inferences that are based on extracted content data yields an accuracy metric of 50% or a 0.5 weighting parameter. Similarly, validation of certain classification inferences that are based on extracted metadata yields an accuracy metric of 30% or a 0.3 weighting parameter. Likewise, validation of certain classification associations contained in an example contextual factors dataset yields an accuracy metric of 20% or a 0.2 weighting parameter. Thus, system 200 can use accuracy metrics obtained from an example validation phase as final weighting parameters to generate a final classification model 212.

In some implementations, the data validator uses or applies scientific processes and systems to extract knowledge or insights from data in various forms, either structured or unstructured. In some implementations, the data validator can be a data scientist/human operator or a computer based system that can receive user input from a human operator.

While deployed in a client's computing environment, system 200 can operate in a training mode or validation mode such that security classifications of unlabeled documents 204 (which generate labeled documents 216) are analyzed to either improve classification determinations generated by final model 212 or validate functionality/accuracy of model 212. In some implementations, a client may have a large repository of legacy unlabeled documents 204 that require security classification. The legacy documents can be provided to system 200 and final model 212 can be used generate labeled documents 216.

In some implementations, system 200 can execute machine learning logic to train or tune predictive inferences of modules 208 based, in part, on labeled documents 206 and 216. Further, during a training process, labeled documents 206 can be received initially by inference/training modules 208 such that modules 208 are iteratively trained until generated classification inferences meet or exceed a threshold accuracy.

In some implementations, prior to generating a final model 212 that is launched in a client's computing environment, system 200 can generate an interim final model. The interim final model can receive a subset of unlabeled documents 204 and security classifications by the interim model be can analyzed by a data validator to validate functionality of a final model 212 that is launched in the client's environment.

In some implementations, system 200 can determine a security classification of at least one unlabeled document 204 using final classification model 212 to produce a labeled document 216. System 200 can then use a data validator to validate that the predicted/generated security classification is correct/accurate relative to particular content, metadata, or contextual factors associated with document 204. In some implementations, data console 214 can include a computing device and a display that are accessible by a user of console 214. System 200 can then provide the classified/labeled document 216 for display and review by the user.

In some implementations, multiple labeled documents 216 can be used by system 200 to train or retrain future models such that system 200 can generate or build new or evolving final models 212. Additional details and descriptions relating to computing systems and computer-implemented methods for generating new or updated final classification models are described in related U.S. patent application Ser. No. 15/400,298, entitled "Systems and Methods for Updating a Classification Model," filed on Jan. 6, 2017. The entire disclosure of U.S. patent application Ser. No. 15/400,298 is expressly incorporated by reference herein in its entirety.

Figure 3:
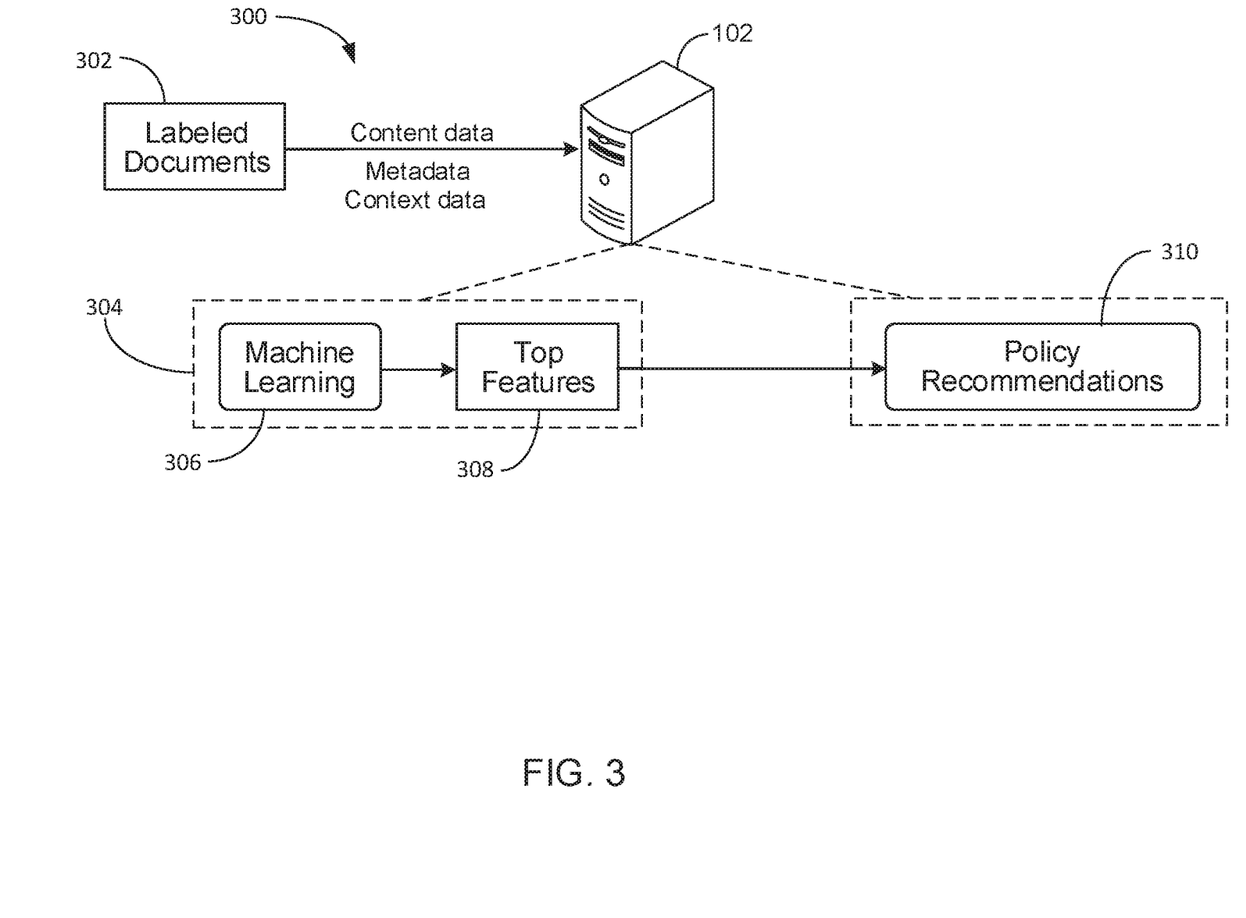
FIG. 3 illustrates a block diagram of an example computing system for determining policy recommendations.

FIG. 3 illustrates a block diagram of an example computing system 300 for determining policy recommendations for generating security classifications for electronic data items. In some implementations, system 300 can be a sub-system of system 100, and so data processing functions of system 300 can be implemented, at least in part, by computing device 102. In addition to computing device 102, system 300 includes labeled documents 302 that are provided to computing device 102.

In the implementation of FIG. 3, computing device 102 executes an example inference module 304. Inference module 304 can be configured to scan, detect, extract or otherwise obtain content data, metadata, or contextual factors for respective labeled documents 302 provided to computing device 102. Module 304 can then execute embedded machine learning logic 306 to iteratively identify top features or attributes that are identified as important to determining a particular security classification. In some implementations, certain document attributes are identified or selected as top features based on how often a particular attribute is associated with a particular security classification.

Computing device 102 can use machine learning logic 306 to generate at least one dataset that includes one or more sets of final top features 308. In some implementations, an example storage medium of module 304 can be used to store the dataset of final top features 308. The dataset of final top features 308 can include respective feature sets that include top content data features that contribute to certain security classifications, top metadata features that contribute to certain security classifications, and top contextual factors/features that contribute to certain security classifications.

For example, content data top features can include word sequences from extracted content data that can include a single word or consecutive words that appear as text in a particular labeled document 302. Embedded machine learning logic, through iterative scans of multiple documents 302, can identify that the word "Whitehouse" is a top content data feature that contributes to a top secret security label of multiple documents 302. Likewise, the word sequence of "Congress Rumors" can also be identified as a second top content data feature that contributes to a top secret security label of multiple documents 302.

Computing device 102 can access or reference the stored list of final top features 308 to generate one or more policy recommendations 310. For example, computing device 102 can generate a policy recommendation 310 that suggests newly generated or unlabeled documents that include content data having repeat occurrences of the words "Whitehouse" or "Congress Rumors" have a high probability of warranting a top secret security classification.

In some implementations, system 300 can generate a system output that includes the dataset of final top features 308 and a summary of learned inferences derived from execution of machine learning logic 306. The summarized inferences and dataset of top features 308 can be used by client or customer's senior leadership as factors to be considered when defining/designing data protection policies or security classification policies.

Figure 4:
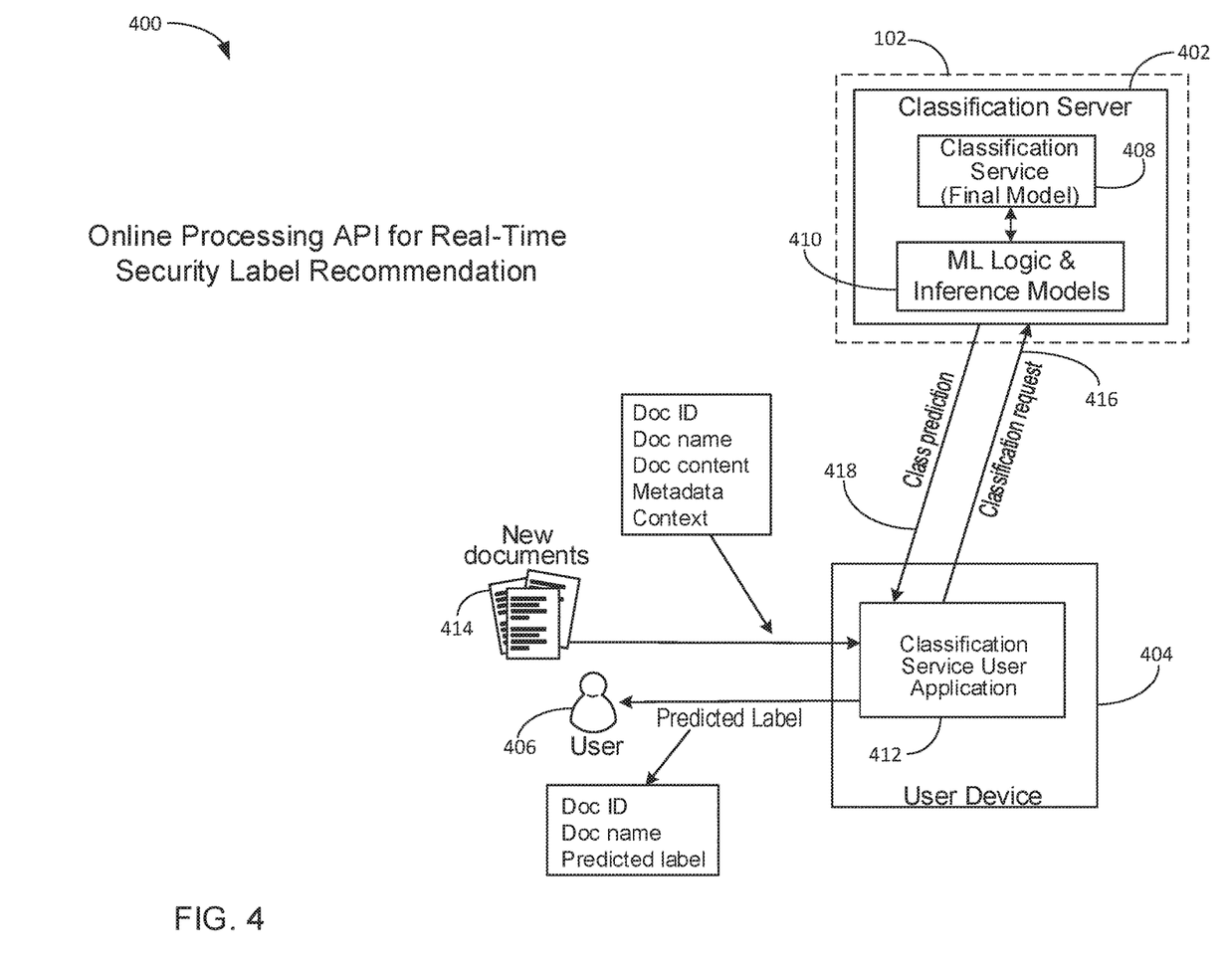
FIG. 4 illustrates a block diagram of an example computing system for determining security classifications for electronic data items by way of an online processing interface.

FIG. 4 illustrates a block diagram of an example computing system 400 for determining security classifications for electronic data items by way of an online processing interface. In some implementations, system 400 can be a sub-system of system 100, and so data processing functions of system 400 can be implemented, at least in part, by computing device 102. In addition to computing device 102, system 400 includes a classification server 402, a user device 404, and a user 406. User device 404 can be an example computing device such as a laptop/desktop computer, smartphone/mobile device, or a tablet device.

In the implementation of FIG. 4 computing system 400 can include an online service mode in which an end user 406 that requires access to classification services can interface with a cloud-based or server-based classification system. User 406 can use the online service to submit one or more requests to obtain security classifications/labels for newly created documents 414 or electronic data items. Hence, system 400 can be operated in a cloud computing environment to provide data processing and computing functions of system 100 to a client/end user 406 as an online service.

For example, a user 406 may require a security classification or label prediction for one or more documents 414. In some implementations, user 406 can send a classification request 416 that includes document 414 to classification server 402 through user application 412. Upon receipt of the classification request 416, server 402 can execute program code to scan, detect, extract or otherwise obtain multiple attributes/features associated with received document 414. Server 402 can then use the extracted attributes to return a predicted classification 418 to user 406.

Server 402 includes a classification service module 408 that references machine learning logic and inference models 410 to generate or predict security labels for documents 414. In some implementations, system 400 can execute one or more iterative training or data validation processes described above with reference to the implementation of FIG. 2. For example, system 400 can execute embedded machine learning logic 410 to iteratively learn, train or modify classification inference models 410 that execute in a back end server or cloud computing environment.

User application 412 can be an example application file that runs locally on user device 404. To access to online server 402, user 406 can launch application 412 to generate an application interface for use in submitting one or more classification requests 416. In some implementations, user application 412 can execute program code that extracts document attributes locally within the computing environment of user device 404. Thus, an example classification request 416 received by server 402 may only include extracted attributes. In response to receiving request 416, server 402 can generate a classification prediction 418 and provide the predicted security label, document ID, and document name to user 406 through an interface of application 412.

Figure 5:
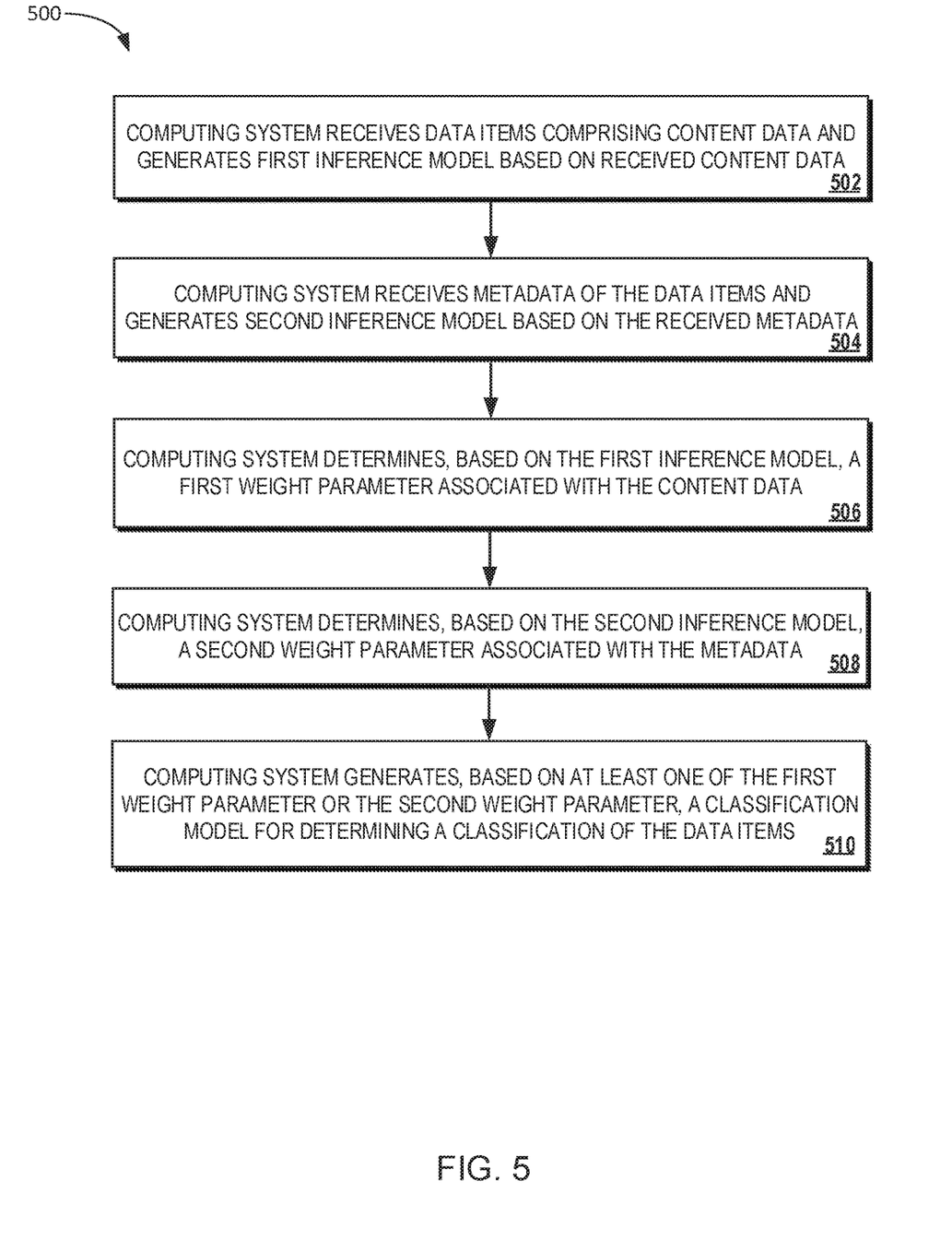
FIG. 5 illustrates a flowchart of an example process for determining security classifications of one or more electronic data items.

FIG. 5 illustrates a flowchart of an example process 500 for determining security classifications of one or more electronic data items. Process 500 begins at block 502 and includes computing system 100 receiving a multiple electronic data items 103 that include content data. In some implementations, the data items are electronic documents that include text content and digital image content. Content module 104 of computing system 100 then generates a first inference model based on the received content data. The first inference model can include one or more classification inferences that are generated based on application of one or more machine-learning computing processes.

At block 504 of process 500, computing system 100 receives metadata associated with respective data items of the multiple electronic data items 103. In some implementations, the metadata includes data item attributes such as the data item originator, the data item file type or file extension, or the data item title and creation date. Content module 106 of computing system 100 then generates a second inference model based on the received metadata associated with respective data items of the multiple data items 103. The second inference model can include one or more classification inferences that are generated based on application of one or more machine-learning computing processes.

At block 506 of process 500, computing system 100 determines a first weight parameter based on the first inference model. In some implementations, the first weight parameter is associated with content data and corresponds to an inference model generated by content module 104. The first weight parameter indicates the instant to which security classifications generated by final model 126 are weighted or influenced by classification inferences generated by content module 104.

At block 508 of process 500, computing system 100 determines a second weight parameter based on the second inference model. In some implementations, the second weight parameter is associated with metadata and corresponds to an inference model generated by metadata module 106. The second weight parameter indicates the instant to which security classifications generated by final model 126 are weighted or influenced by classification inferences generated by metadata module 106.

At block 510 of process 500, computing system 100 generates final classification model 126 for determining a security classification of at least one data item of the multiple received data items. In some implementations, generating the classification model can include computing system 100 using one or more machine-learning processes. For example, system 100 can cause model weighting module 124 to execute one or more machine learning algorithms that receive at least one weight parameter as an input that is used, in part, to generate final classification model 126.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a computing system, training data comprising electronic documents for which security labels have already been applied, the training data for training a security classification model for determining a security classification of other electronic documents;
   generating, by the computing system, a first inference model based on (i) text content that occurs in the electronic documents, and (ii) the security labels that have already been applied to the electronic documents;
   receiving, by the computing system, metadata that is associated with the electronic documents and that specifies respective authors associated with the electronic documents;
   generating, by the computing system, a second inference model based on (i) the received metadata that is associated with the electronic documents and that specifies respective authors associated with the electronic documents, and (ii) the security labels that have already been applied to the electronic documents;
   receiving, by the computing system, contextual data that specifies a business context associated with the electronic documents and that is different than the metadata that is associated with the electronic documents;
   generating, by the computing system, a third inference model based on (i) the received contextual data that specifies the business context associated with the electronic documents and that is different than the metadata that is associated with the electronic documents, and (ii) the security labels that have already been applied to the electronic documents;
   determining, by the computing system and based on the first inference model, a first weight parameter associated with the content data;
   determining, by the computing system and based on the second inference model, a second weight parameter associated with the metadata;
   determining, by the computing system and based on the third inference model, a third weight parameter associated with the contextual data;
   generating, by the computing system and based on at least one of the first weight parameter, the second weight parameter, or the third weight parameter, the security classification model for determining the security classification of the other electronic documents; and
   determining a security classification of one or more of the other electronic documents using the security classification model.

2. The method of claim 1, wherein the security labels comprise a top secret security label or a sensitive security label.

3. The method of claim 1, wherein the metadata comprises file names.

4. The method of claim 1, wherein the metadata comprises creation or modification dates.

5. The method of claim 1, wherein the metadata comprises file paths.

6. The method of claim 1, wherein the metadata comprises electronic document type identifiers.

7. A system comprising:
   one or more processing devices; and
   one or more machine-readable storage devices for storing instructions that are executable by the one or more processing devices to perform operations comprising:
   receiving training data comprising electronic documents for which security labels have already been applied, the training data for training a security classification model for determining a security classification of other electronic documents;
   generating a first inference model based on (i) text content that occurs in the electronic documents, and (ii) the security labels that have already been applied to the electronic documents;
   receiving metadata that is associated with the electronic documents and that specifies respective authors associated with the electronic documents;
   generating a second inference model based on (i) the received metadata that is associated with the electronic documents and that specifies respective authors associated with the electronic documents, and (ii) the security labels that have already been applied to the electronic documents;
   receiving contextual data that specifies a business context associated with the electronic documents and that is different than the metadata that is associated with the electronic documents;
   generating a third inference model based on (i) the received contextual data that specifies the business context associated with the electronic documents and that is different than the metadata that is associated with the electronic documents, and (ii) the security labels that have already been applied to the electronic documents;
   determining, based on the first inference model, a first weight parameter associated with the content data;
   determining, based on the second inference model, a second weight parameter associated with the metadata;

determining, based on the third inference model, a third weight parameter associated with the contextual data;

generating, based on at least one of the first weight parameter, the second weight parameter, or the third weight parameter, the security classification model for determining the security classification of the other electronic documents; and determining a security classification of one or more of the other electronic documents using the security classification model.

8. The system of claim 7, wherein the security labels comprise a top secret security label or a sensitive security label.

9. The system of claim 7, wherein the metadata comprises file names.

10. The system of claim 7, wherein the metadata comprises creation or modification dates.

11. The system of claim 7, wherein the metadata comprises file paths.

12. The system of claim 7, wherein the metadata comprises electronic document type identifiers.

13. A non-transitory machine-readable storage device storing instructions that are executable by one or more processing devices to perform operations comprising receiving training data comprising electronic documents for which security labels have already been applied, the training data for training a security classification model for determining a security classification of other electronic documents;

generating a first inference model based on (i) text content that occurs in the electronic documents, and (ii) the security labels that have already been applied to the electronic documents;

receiving metadata that is associated with the electronic documents and that specifies respective authors associated with the electronic documents;

generating a second inference model based on (i) the received metadata that is associated with the electronic documents and that specifies respective authors associated with the electronic documents, and (ii) the security labels that have already been applied to the electronic documents;

receiving contextual data that specifies a business context associated with the electronic documents and that is different than the metadata that is associated with the electronic documents;

generating a third inference model based on (i) the received contextual data that specifies the business context associated with the electronic documents and that is different than the metadata that is associated with the electronic documents, and (ii) the security labels that have already been applied to the electronic documents;

determining, based on the first inference model, a first weight parameter associated with the content data;

determining, based on the second inference model, a second weight parameter associated with the metadata;

determining, based on the third inference model, a third weight parameter associated with the contextual data;

generating, based on at least one of the first weight parameter, the second weight parameter, or the third weight parameter, the security classification model for determining the security classification of the other electronic documents; and determining a security classification of one or more of the other electronic documents using the security classification model.

14. The device of claim 13, wherein the security labels comprise a top secret security label or a sensitive security label.

15. The device of claim 13, wherein the metadata comprises file names.

16. The device of claim 13, wherein the metadata comprises creation or modification dates.

17. The device of claim 13, wherein the metadata comprises file paths.

* * * * *